(12) United States Patent
Divisi

(10) Patent No.: US 11,828,414 B2
(45) Date of Patent: Nov. 28, 2023

(54) AIR/OIL MIST GENERATOR

(71) Applicant: DROPSA S.p.A., Milan (IT)

(72) Inventor: Walter Divisi, Monaco (MC)

(73) Assignee: DROPSA S.p.A., Milan (IT)

( * ) Notice: Subject to any disclaimer, the term of this patent is extended or adjusted under 35 U.S.C. 154(b) by 292 days.

(21) Appl. No.: 16/851,491

(22) Filed: Apr. 17, 2020

(65) Prior Publication Data

US 2020/0332951 A1 Oct. 22, 2020

(30) Foreign Application Priority Data

Apr. 18, 2019 (IT) .................. 102019000006062

(51) Int. Cl.
*F16N 7/34* (2006.01)

(52) U.S. Cl.
CPC ..................... *F16N 7/34* (2013.01)

(58) Field of Classification Search
CPC .. F16N 7/34; B05B 7/10; B05B 1/265; B05B 7/0416; B05B 1/3436; B05B 14/00; B05B 7/0483; B05B 7/064; B05B 7/2424
USPC ....................................... 184/6.26
See application file for complete search history.

(56) References Cited

U.S. PATENT DOCUMENTS

| 2,613,067 A | 10/1952 | Goodyer |
| 3,515,676 A | 6/1970 | Hierta |
| 4,201,276 A | 5/1980 | Bardin et al. |
| 4,335,804 A | 6/1982 | Bardin et al. |
| 4,637,493 A * | 1/1987 | Ehlert .............. F16N 39/04 184/6.26 |
| 2002/0084146 A1* | 7/2002 | Itoh .................. F16N 7/34 184/57 |
| 2014/0264126 A1* | 9/2014 | Hedger .............. B29B 7/7409 251/313 |

FOREIGN PATENT DOCUMENTS

CN 207080795 U 3/2018

* cited by examiner

*Primary Examiner* — Phutthiwat Wongwian
*Assistant Examiner* — Omar Morales
(74) *Attorney, Agent, or Firm* — Dickinson Wright PLLC; Andrew D. Dorisio

(57) ABSTRACT

A generator of air/oil mist includes an accumulation chamber for a mist of particles of oil in air, and equipped with a first mist outlet and a nebulizer feeding into the accumulation chamber, the nebulizer including a first nozzle supplied with pressurised air, which features at least a first channel supplied with the pressurised air, each channel being equipped with an outlet on a surface of the first nozzle partially defining a first chamber axially symmetrical with respect to an axis, the channels being positioned to generate a rotation of the air fed into the first chamber around the said axis, the surface of the first nozzle featuring a section converging towards an outlet hole, the nebulizer featuring a second nozzle supplied with oil and feeding out into the first chamber so that the oil is suctioned via the second nozzle because of the air flowing through the first chamber.

12 Claims, 5 Drawing Sheets

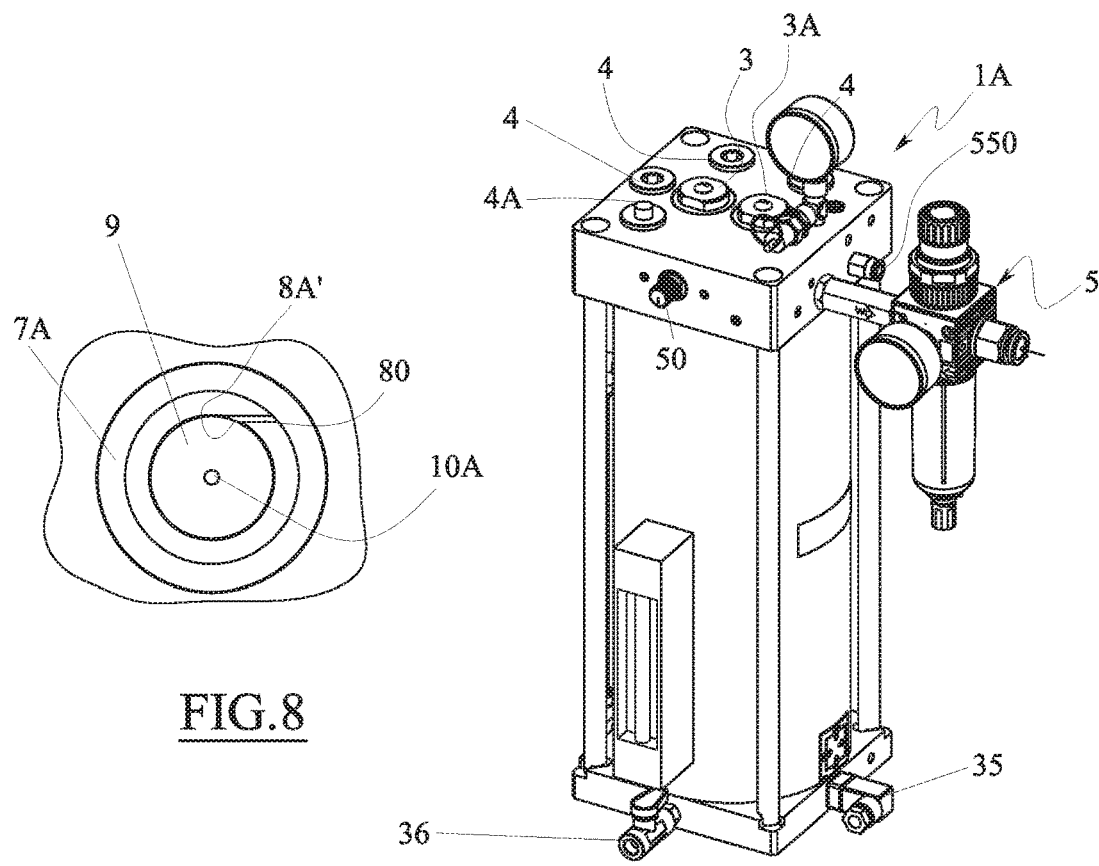
FIG.8
FIG.9
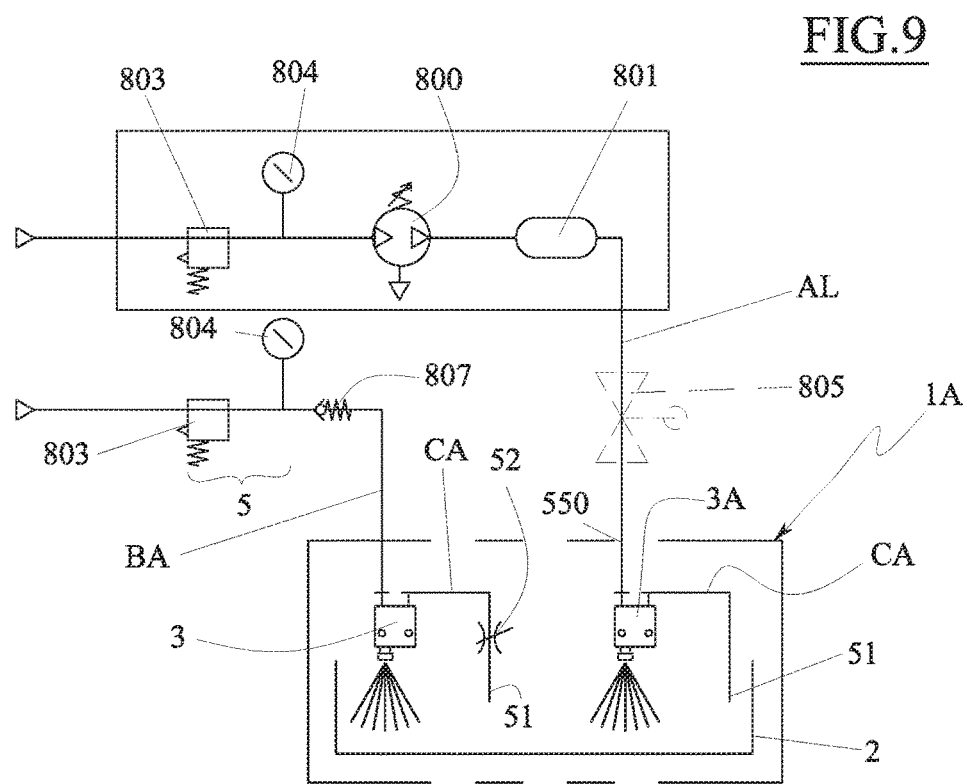
FIG.10

AIR/OIL MIST GENERATOR

This application claims priority to Italian Patent Application No. 102019000006062 filed on Apr. 18, 2019, which is incorporated herein by reference.

FIELD OF THE INVENTION

The present invention relates to an air/oil mist generator.

In particular, it relates to a mist generator to be used in a lubrication system.

BACKGROUND ART

In the field of lubrication, mist generators are known which apply the Venturi tube principle. One of these systems is currently marketed by the applicant under the trade name NEB OL.

This comprises a Venturi tube into which pressurised air is fed axially. At the throat of the Venturi tube (minimum passage section) there is a nozzle envisaged for drawing up oil. In practice, the oil is suctioned via the nozzle by the vacuum which is created in the minimum passage section, by Venturi effect.

The commonly known systems allow a flow of air to be supplied inside which the lubricant is present. Nevertheless, the dispersion of the particles of oil in the air is not satisfactory. Indeed, the particles of oil created in the commonly known Venturi systems are somewhat heavy and tend to precipitate and agglomerate, especially if the pipelines are rather long.

In certain uses within the field of lubrication, this does not create particular problems, since the oil is, in any case, carried by the air to the user device. In others fields, nevertheless, it is preferable to obtain a better dispersion of particles of oil in the air, with much finer particles, to increase lubrication performance.

The presence of 'large' particles of oil is disadvantageous above all if the mist has to lubricate rotating bodies or tools wherein heaviness of the particles increases coalescence and decreases therefore the performance of the lubricating action.

The dimension of the particles of oil and the dispersion thereof also influences the structure of the lubrication system. If the particles are 'coarse', shorter tubes must be used, while if the particles are finely dispersed and very small, it is possible to use longer distribution tubes, which is advantageous in terms of the lubrication system design simplicity.

Alternative mist generation systems are also commonly known, for example those in which the mixing takes place without the use of a Venturi system, but through what is known as a vortex system, such as that described, for example, in patent U.S. Pat. No. 4,335,804.

The advantage of the vortex systems with respect to the Venturi systems, is that they are more flexible. Indeed, the vortex is active (and therefore is self-supporting and generates mist) within a broader range of air pressure and flow levels.

In practice, the pressure used by the system to generate the mist originates from the difference between the supply pressure of the nebulizer (whether of the Venturi or vortex kind) and the pressure inside the chamber where the mist is stored.

For example, if the supply pressure (of the line) is 6 bar, and the pressure of the chamber is 4 bar, the mist generation system operates with a pressure of 2 bar.

A vortex system allows operation within in a broader range of pressure and flow levels than a Venturi system.

The disadvantage of the 'conventional' vortex system with respect to the Venturi system is, meanwhile, that the mist particles are coarser and less even with respect to those generated with a Venturi system.

SUMMARY OF THE INVENTION

The object of the present invention is to provide an air/oil mist generator, which is improved with respect to the commonly known technique.

A further object of the invention is to provide a generator which is able to create a flow of air/oil mist, in which the particles of oil are finely dispersed, in an extremely homogeneous manner, in the flow of air.

Another object of the present invention is to provide a generator which is able to create a mist of oil in air, with extremely fine particles.

This and other objects are achieved by means of a generator produced according to the technical teachings of the claims appended hereto.

Advantageously, the generator is able to select the finer particles of oil and feed then only those selected towards an outlet, so as to improve the suspension thereof within the flow of lubrication air.

Still more advantageously the generator is able to generate a very homogeneous mist, with micro-particles of oil, both in the event that medium/high air flow rates are required (for example for processing tools with standard dimensions) and in the event of very low air flow rates (for example for processing with very small tools).

In this wording, the term 'micro-particles' refers to lubricant particles with a diameter of less than one micron.

BRIEF DESCRIPTION OF THE FIGURES

Further characteristics and advantages of the invention will become apparent in the description of a preferred but not exclusive embodiment of the device, illustrated—by way of a non-limiting example—in the drawings annexed hereto, in which:

FIG. 6 is a schematic view of a lubrication system comprising the generator in

FIG. 5;

FIG. 8 is a plan view of a detail of the high-pressure nebulizer in FIG. 7;

FIG. 9 is a perspective view of the generator in FIG. 7; and

FIG. 10 is a schematic representation of a supply system for the generator in FIGS. 7 and 9.

DETAILED DESCRIPTION OF THE INVENTION

With reference to the aforesaid figures, reference number 1 denotes an air/oil mist generator as a whole.

Figure 5:
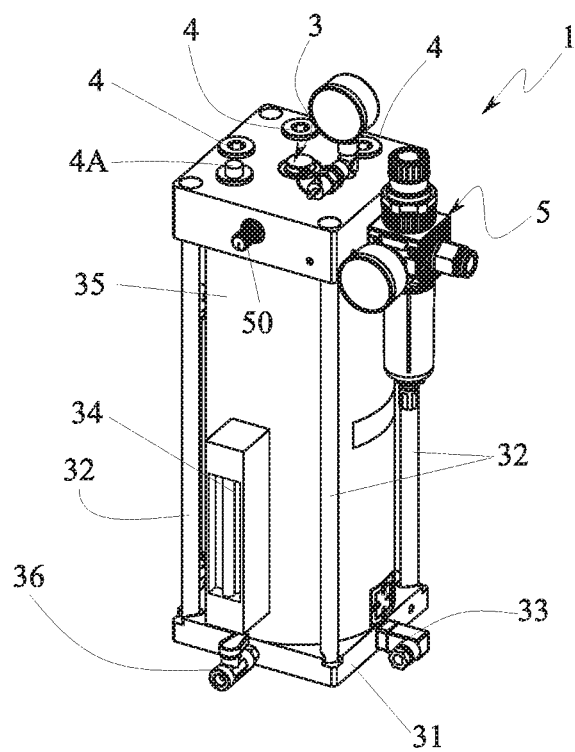
FIG. 5 is an overall perspective view of a generator according to the present invention.

Reference must be made initially to FIG. 5, which shows a possible configuration of the generator. This can comprise a first 30 and a second plate 31, which, through tie-rods 32, sandwich in a sealed manner (through gaskets T) a hollow cylindrical element 35 (or an element with a different section), so as to form an accumulation chamber 2. In the accumulation chamber 2 an air/oil mist forms and, contemporaneously, this can act as an oil tank.

Figure 6:
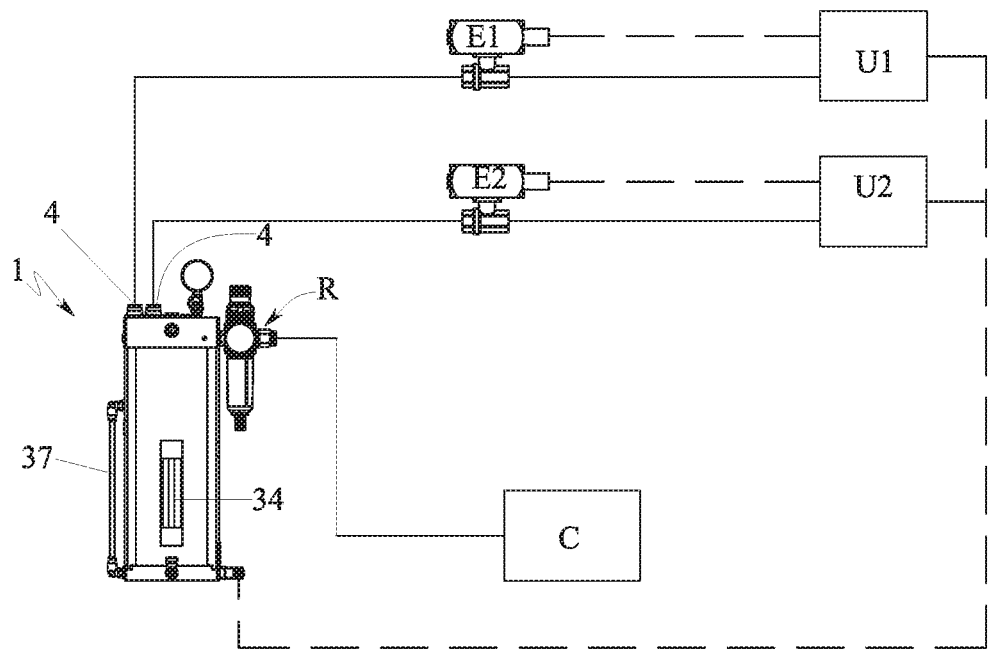
Figure 3:
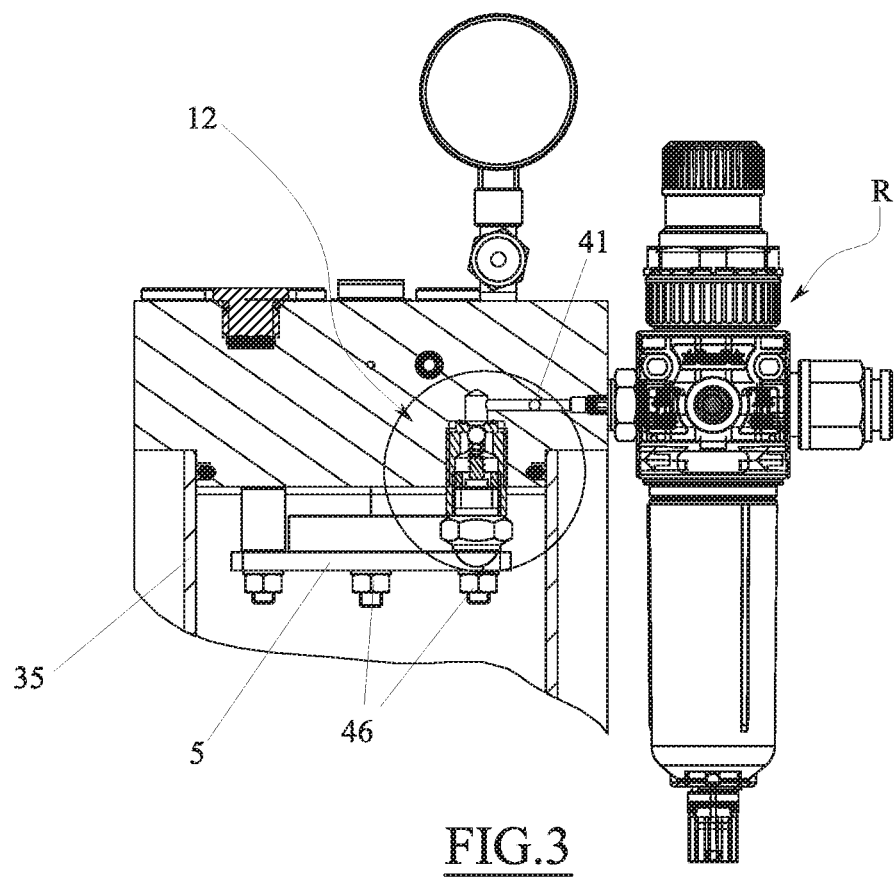
FIG. 3 is a simplified section of a detail of the generator.
Figure 4:
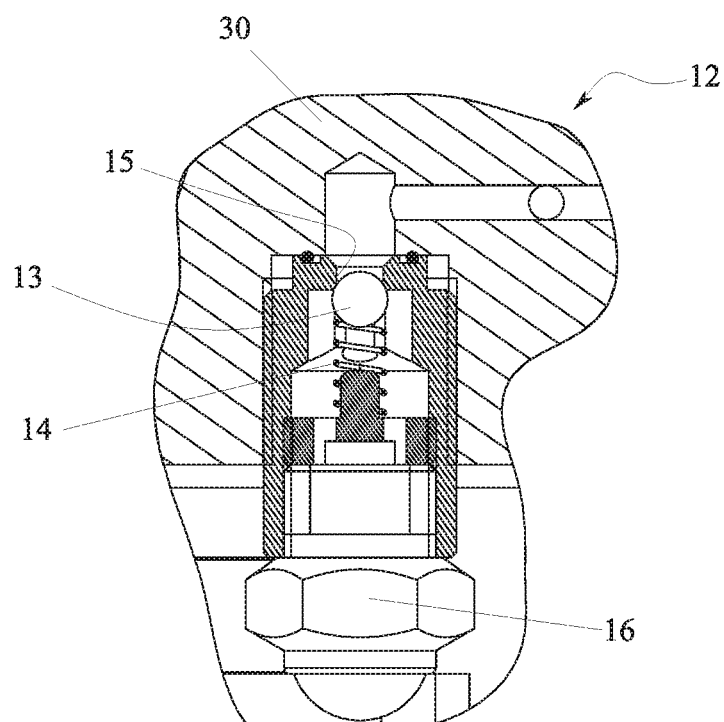
FIG. 4 is an exploded view of the detail circled in FIG. 3.

Outside the accumulation chamber 2 a gauge 37 (FIG. 6) can be envisaged to show the level of the oil present in the chamber. The gauge can be of the column type, formed of a small transparent tube which shows the level present in the accumulation chamber 2. Advantageously, there can also be an electronic level sensor (not shown envisaged), connected to the door 33, which measures the level of the oil present in the chamber. The sensor can be suitably interfaced with a control unit which tops up the level via the further door 36 (for example, equipped with a manual valve) or via other access ways to the chamber not shown.

The door 36, equipped with a valve, for example a manual valve, can also be used to drain the accumulation chamber 2 completely.

The first plate 30 features a plurality of through-holes (possibly threaded, for coupling with plugs or quick couplings 4A), which define various air/oil mist outlets 4. In practice, when an outlet 4 is open, it is in communication with the interior of the accumulation chamber 2 and (see FIG. 6), through each of these, the air/oil mist is delivered to a user device U1, U2, via a suitable pipeline T1, T2. Advantageously, the pipelines T1, T2, can be intercepted by suitably controlled solenoid valves E1, E2, or by manual valves.

According to the invention, the generator comprises at least one nebulizer 3 feeding right into the said accumulation chamber 2.

Figure 1:
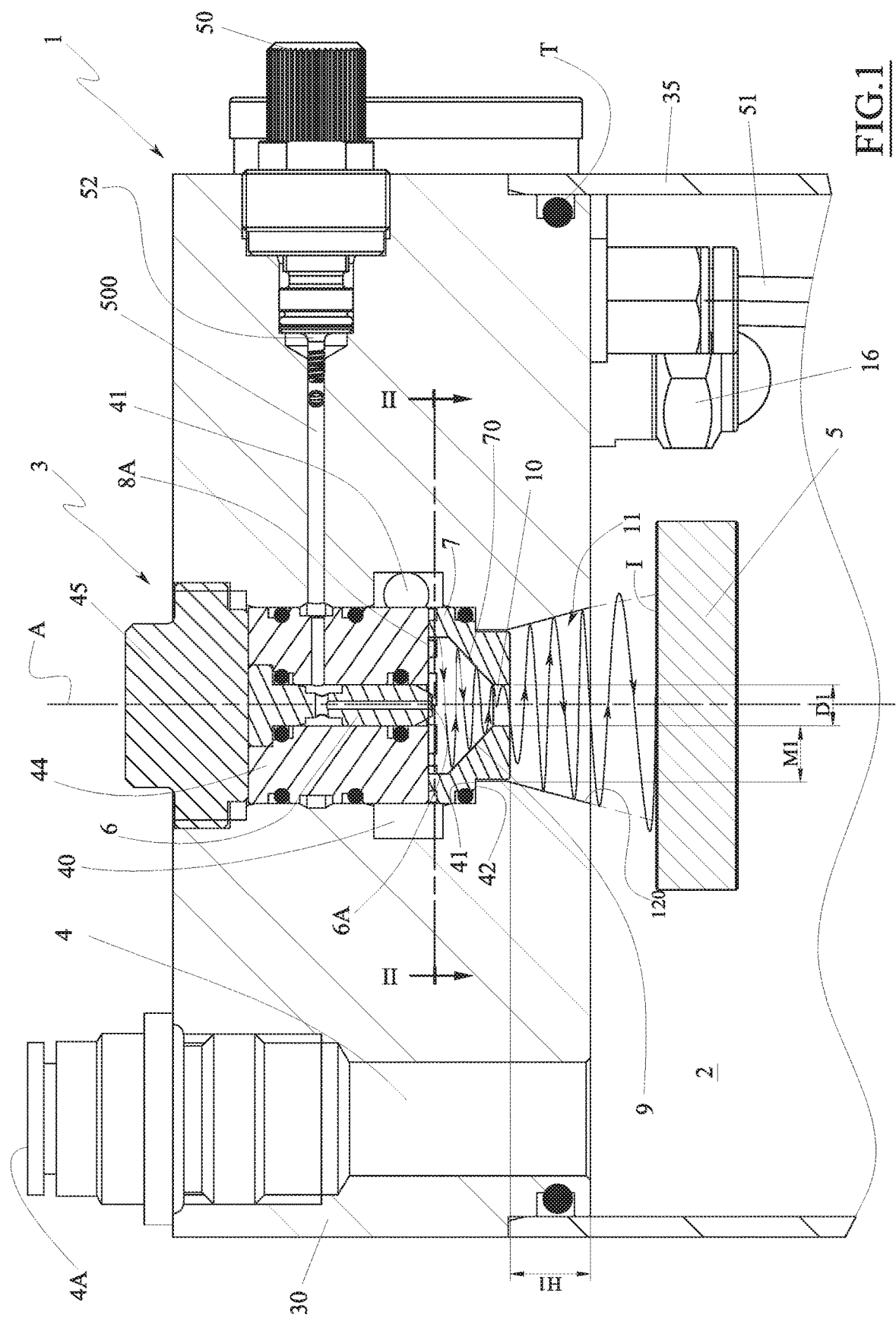
FIG. 1 is a section view of a nebulizer which is part of the generator according to the present invention.
Figure 2:
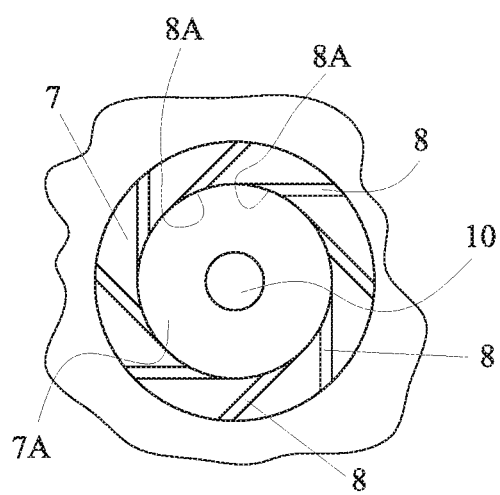
FIG. 2 is a simplified section taken along the line II-II in FIG. 1.

In the case illustrated, the nebulizer 3 is a 'medium/low pressure' nebulizer and is clearly visible in FIG. 1.

In the present wording, the term 'medium/low pressure' means that it is configured to work in an optimal manner with an air intake pressure ranging from 4 and 8 bar, preferably between 5 and 6 bar.

As can be seen, the nebulizer 3 can comprise a first nozzle 7 supplied with pressurised air, for example via the annular recess 40 supplied through the passage 41, directly connected to the outlet of a pressure regulator R.

The nozzle 7 can feature first channels 8 supplied by the pressurised air coming from the regulator R.

The channels 8 are clearly visible in FIG. 2, and each one of these is equipped with an outlet 8A on a surface 70 of the first nozzle which defines, at least partially, a first chamber 9 axially symmetrical with respect to an axis A.

Specifically, the outlet 8A can be envisaged on a 'cylindrical' section of the first nozzle 7, which joins with a convergent section which will be discussed later.

The channels 8 are positionable so as to generate a rotation (see the arrows in FIG. 1) of the air fed into the first chamber 9 around the said the said axis A; preferably these channels feed out tangentially with respect to the surface 70, which is circular in section at the outlets 8A.

The channels 8 can have a constant section, as shown, or can converge towards the outlet 8A.

As can be seen in FIG. 1, the surface 70 of the first nozzle features at least one section converging towards an outlet hole 10 (of the said nozzle).

Advantageously the area of the outlet hole 10 should be greater than the overall area of the outlets 8A, to allow the generation of a 'vacuum' or suction inside the chamber 9, whose utility will be explained later on.

Advantageously, the ratio between the overall area of the outlets 8A and the area of the outlet hole 10 can be less than 0.7, preferably comprised between 0.3 and 0.5. This is to create a vacuum area in the chamber 9, which allows the second nozzle 6 to draw up the lubricant.

In the configuration illustrated, the nozzle can be produced as a single piece, and features a shoulder 41 which, for assembly, abuts with a stop 42 on the first plate 30.

Downstream of the first nozzle 7, towards the accumulation chamber 2, there is a divergent channel 11 envisaged, into which the outlet hole 10 of the first nozzle 7 discharges.

Advantageously, the divergent channel can be defined by a passage with a frusto-conical section, produced in the first plate 30.

Going back to FIG. 1, it is known that the divergent channel 11 can be defined by a wall 120 (for example, of the first plate 30) which is spaced apart from the perimeter of the outlet hole 11 (measurement M1 shown in the drawing), at least on one surface comprising the outlet section of the said hole 10.

It has been found that this distance M1 can improve (diminish) the dimension of the particles fed into the accumulation chamber 2, probably because of the detachment of a turbulent flow which forms directly downstream of the hole 10, because of the immediate restoration of pressure.

The distance M1 notably affects the quality and dimension of the particles and it has been found that the minimum distance is at least half the diameter of outlet D1, preferably the minimum distance M1 is at least equal to a diameter of outlet D1.

The optimal measurement of M1 is essentially comprised between one and half times the outlet diameter and 4.5 times the outlet diameter.

The divergent wall 120 then, together with the rotation generated by the channels of the first nozzle 7 (and therefore by the air), optimizes the dimension of the particles of oil expelled.

Another characteristic which affects the dimension of the oil particles is the roughness of the wall 120 of the divergent channel 11. The rougher this section is, the better the coalescence of the larger sized particles, which are effectively removed from the flow.

It is presumed, indeed, that, upon encountering the "crests" on the surface, the micro particles further divide, becoming still smaller. Part of the larger particles, meanwhile, stop in the troughs in the surface and are thus excluded from the flow.

The optimal roughness value for the wall of the divergent channel 11 is preferably 1.2 μmRa or higher.

Preferably, the roughness is achieved through processing which creates a spiral on the surface which ideally rotates counter to the rotation direction of the vortex of air and oil.

The first chamber 9 can be further defined by a flat surface of an intermediate element 44 which can be pressed against the nozzle 7 by a suitable threaded element 45, for example screwed onto the first plate 30.

Obviously, there are various OR-ring are present between the intermediate element and the first plate 30, but also between the first nozzle 7 and the latter, to keep the pressurised air confined within the desired position. The seals are clearly visible in FIG. 1.

Advantageously, the channels 8 can be defined by the nozzle 7, and by the flat surface on which this is resting.

It is known that, for the inflow of oil, the nebulizer 3 also features a second nozzle 6 which feeds into the said first chamber 9.

For example, the second nozzle 6 is inserted axially into a hole in the intermediate element 44, with appropriate OR-rings, and features a tip (in which a delivery hole 6A is made) which projects slightly with respect to the aforesaid flat surface (of the intermediate element) facing the chamber 9.

Advantageously, as can be noted in FIG. 1, the second nozzle 6 features a second delivery hole 6A which is coaxial with respect to the axis A. Furthermore, the second nozzle 6 is associated with a supply channel CA which can draw up the oil present inside the accumulation chamber 2. For example, the supply channel features s passages 500 connected to a small suction tube 51, which draws up the oil accumulated in proximity to the bottom of the accumulation chamber 2. The supply channel can feature a valve 50 for the fine adjustment of the flow rate of the oil reaching the second nozzle 6; advantageously, the flow is represented visually on the gauge 34.

It has been found that, to achieve optimal nebulizer performance, it is preferable that the second nozzle 6 feeds out at the outlet 8A of the said channels 8, preferably at the centerline of this outlet 8A.

Specifically, the delivery hole 6A of the second nozzle 6 faces the outlet 8A of the said channels 8, preferably at the centerline of this outlet 8A.

Furthermore, it is useful for the second nozzle to feed out axially with respect to the nozzle 7.

According to one aspect of the invention, the outlet hole 10 of the first nozzle 7 faces a condenser 5 envisaged inside the accumulation chamber 2, the condenser being preferably located downstream of the divergent channel 11.

The condenser can feature dimensions which ensure the impression I obtained by the extension of the conical wall 120 is entirely contained within the condenser.

It should be mentioned that in the present wording, the term 'condenser' 5 is used to define the plate-like element 5 positioned in front of the outlet of the nebulizer 3 (advantageously supported by screws and bolts 46 secured to the first plate 30).

Even if the condenser 5 is cooled by the inflow of air which hits it, its function is not to "condense" (in the physical sense of the word) the particles of oil which hit it.

At the most, it acts as a shield which facilitates the coalescence of significantly sized particles of oil, which hit the condenser 5 and which cannot—because of the significant weight thereof—be transported by the air into the spaces around the said condenser, inside the accumulation chamber 2.

Later on, in the description, with particular reference to FIG. 7, other possible configurations of the nebulizer 3 will be illustrated which, however, can feature the same fundamental dimensions described earlier. And this also applies to the further nebulizer 3A which will be described with reference to FIG. 7.

The operation of the invention is clear from the description above and is essentially as follows.

The accumulation chamber 2 is pre-filled with a certain amount of oil, so as to be able to supply the primer 51, which is long enough to reach the bottom of the chamber.

When lubrication is required by a user device, the regulator R sends pressurised air to the nozzle 7 (for example through the recess 40 and the supply 41).

The pressurised air flows through the nozzle channels 8. After reaching the chamber 9, the pressurised air assumes a vortex movement around to the axis A of the nebulizer 3, because of the conformation and the arrangement of the channels 8.

Inside the first nozzle 7, the rotating air is conveyed towards the hole 10 through the convergent section 70 of the said nozzle, increasing the speed thereof and decreasing the pressure thereof.

Also, because of the relationship between the overall area of the outlets 8A and of the hole 10, a vacuum (or suction) forms inside the chamber 9 which suctions up the oil through the second nozzle 6, and the suctioned oil mixes with the air rotating in a vortex in the chamber 9, becoming a fine powder.

As soon as the air mixed with the oil is expelled through the hole 10, the divergent section (spaced apart by M1) generates an abrupt recovery of the pressure of the air with the creation of vortexes and, contemporaneously, on the wall 120 of the divergent section the particles of heavier oil accumulate, which are therefore forced out from the flow of air/oil.

Only the lighter particles remain suspended in the air which flows past the divergent section, and these smalls particles spread within the accumulation chamber 2.

Given that the condenser 5 faces the outlet of the nebulizer 3, the former collects part of the heavy oil particles and condenses them thereupon, which then fall onto the bottom of the accumulation chamber 2.

The structure described above creates, inside the accumulation chamber 2, a mist of extremely fine, suspended oil particles, with a diameter approximately less than 1 μm, the said mist being conveyed by the air which flows through the outlet 4.

The position of the outlet 4, on the roof of the chamber, subjects the particles of oil to further selection, and only those which are extremely small and light can be conveyed by the pressurised air coming out of the outlet 4.

The system described above manages to generate extremely small oil particles, which form very fine a mist and which can be conveyed by the pressurised air delivered by the generator 1, therefore providing excellent lubrication.

Obviously, the particles which condense on the divergent wall 120, on the condenser 5, or which do not manage to reach the outlet 4 because they are too heavy, precipitate onto the bottom of the accumulation chamber 2, mixing with the oil already present therein.

Advantageously, the accumulation chamber 2 is associated with a differential pressure regulator 12, which feeds the compressed air into the chamber when the difference between the internal pressure in the accumulation chamber 2 and the supply pressure exceeds a pre-set threshold.

This happens in the event that the demand from the user devices for lubricated air is particularly high and exceeds that which can be handled directly by the nebulizer.

In this case the differential pressure regulator 12 (FIGS. 3 and 4) carries a surplus of pressurised air inside the accumulation chamber 2, therefore allowing user devices U1, U2 to be supplied.

In the example described, the differential pressure regulator 12 can comprise a valve element 13 with load applied by a spring 14 towards an opening 15 in communication with the supply of pressurised air (i.e. the regulator R); the spring 14 and the part of the valve element 13 are, meanwhile, in communication with the accumulation chamber 2 with the result that, when the pressure in the accumulation chamber 2 falls below a threshold pre-set according to the load applied by spring to the valve element 13 (set, for example, at 2 bar), the valve element 13 releases the opening 15, thereby allowing the flow of air from the pressurised air supply towards the accumulation chamber 2.

To prevent the infeed of air into the chamber having a negative effect on the mist present therein, the outlet of the differential regulator 12 inside the accumulation chamber 2 features a silencer 16, which 'breaks up' the air fed so as to prevent significant interference with the mist present in the chamber.

In the description above, a generator 1 is described which features a single nebulizer 3, which preferably works at medium/low pressure (i.e. through the pressure of supply lines which are common in many industrial complexes, the said pressure being approximately 6 bar).

A system such as the one described above is suitable to supply machines (for example cutting machines) with medium-range tools, and therefore which also require medium lubrication air flow rates, i.e. in the range of 2-8 m$^3$/hour.

In the event of jobs with tools requiring a lower mist flow rate for lubrication and cooling, it has been found that the system described above is scarcely suitable. Or better, it has been found that in the event of low flow rates, i.e. those below 2 m$^3$/hour, the capacity to generate a fine-particle mist falls noticeably. This is because the back-pressure present in the accumulation chamber 2 is too high to keep the vortex system of the nebulizer 3 working.

The generator 1A, shown in FIGS. 7 to 10, has been devised to more effectively supply systems which feature user devices with highly variable air flow rates, and to keep the concentration of particles of oil as constant as possible also in low-rate flows.

In the said figures, the same numerical references are used as those used to denote parts with a similar function to those already described.

Figure 7:
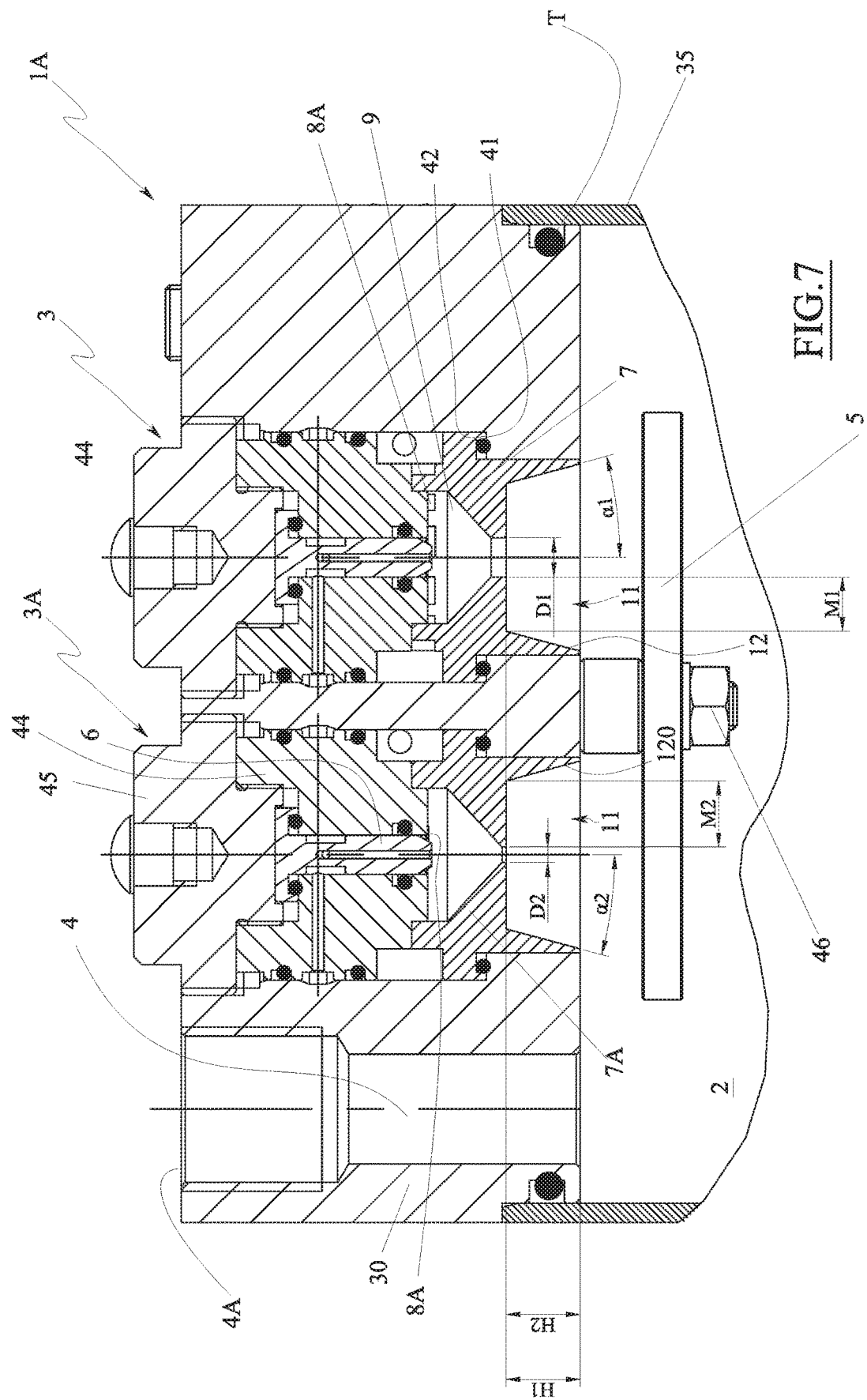
FIG. 7 is a section view of a variant of the generator according to the present invention, which features, specifically two nebulizers, a high-pressure one and a low-pressure one.

As can be noted specifically from an analysis of FIG. 7, this generator is essentially similar to that described earlier and this also features a nebulizer 3 whose function is identical to that described.

For example, the dimensions of the nebulizer 3 which are functional to the generation of the mist, are those described earlier.

Nevertheless, in this specific configuration, the said nebulizer features a nozzle 7 which, apart from defining the chamber 9, also supplements or better defines the divergent channel 11.

As mentioned earlier, the characteristics of the chamber 9 and of the divergent channel 11, for the nebulizer 3, are exactly the same as those already described and do not therefore need to be reported again.

The simplification introduced by the addition, within the same piece, of both the chamber 9 and the divergent channel 11 is obvious. Indeed, the processing of the plate 30 in this variant, which is necessary in order to house the nebulizer 3, if compared with that described in FIG. 1, is much more simple since the said plate features merely a through-hole with a cylindrical section, which houses and supports (also by means of the shoulder 41 and the step 42) the new nozzle configuration.

Obviously, also in the case described in FIG. 1, i.e. in which a single nebulizer 3 is present in the generator 1, it will be possible to use the simplified version of the nozzle 7 (which comprises the divergent channel 11) and of the plate 30 described herein.

Going back, now, to the description of the generator 1A, the more obvious difference with respect to that described for the single-nebulizer version, is the presence of a further nebulizer 3A configured to generate a mist starting from a higher pressure with respect to the nebulizer 3.

For example, the further nebulizer 3A features the same conceptual functioning as the nebulizer 3 but is configured to work at higher pressure levels and with lower flows.

Therefore, the essential difference from the nebulizer 3 lies in the area of the hole 10A and in the overall area of the outlets 8A (of which there can be only one).

The further nebulizer 3 can be configured to work with a supply pressure of between the 2 and the 4 times, preferably approximately 3 times, the line pressure, which is normally around 6 bar.

In practice, the two nebulizers 3, 3A are geometrically similar, but the further nebulizer 3A (and specifically the nozzle 7') features dimensions which have been optimised to work (generating mist) with a lower air flow.

This is immediately clear upon analysis of FIG. 8, which shows the conformation of the nozzle 7A in the part defining the chamber 9. In practice, this is a top-down view of the single nozzle 7A.

This features a single channel 80 (or, in any case, a smaller number of channels 8 with respect to the nebulizer 3). Also, the passage section of the channel 80, and consequently the area of the outlet 8A, is smaller than the outlet 8A of the channels 8 of the nebulizer 3. This can be seen clearly upon analysis of FIG. 7, where the outlet 8A of the channel 80 of the further nebulizer 3A is almost invisible if compared with those of the first nebulizer.

The remaining dimensions of the further nebulizer 3A essentially correspond (or are at least in scale) with those of the nebulizer 3 but have been optimised to work at a higher pressure.

Specifically, again as per FIG. 7, it is known that the semi-angle α1 of the opening of the divergent section 11 of the nebulizer 3 can correspond to the angle α2 of the further nebulizer 3A. The angle α1 and/or α2 can be between 10° and 35°, preferably 15°.

The height H1 of the divergent section 11 of the nebulizer 3, can correspond to the height H2 of the said section of the further nebulizer 3A.

The height H1 and/or H2 is preferably 1.5 times the diameter of outlet D1, D2. Preferably the height H1, H2 is essentially twice the diameter of outlet D1, and/or four times the diameter of outlet D2.

The values stated above are particularly important; indeed, these specific measurements and angles were obtained through a rather long and complex optimization process, based on trial and error. The range and the dimensions described above are those which enabled the device to perform best.

The supply of air to the further nebulizer 3A can be obtained through a line AL, on which there may be a pressure booster 800 present (see possible supply diagram in FIG. 10), which pressurizes a tank 801 of high-pressure air. Instead of the pressure booster, it is obviously possible to use a high-pressure compressor.

The pressure booster can be supplied to a suitable air handling unit 803 and there can be a pressure gauge 804 envisaged on the supply line.

The further nebulizer 3A (high-pressure) can feature an oil supply provided via the said primer 51 described earlier. Advantageously, the line CA for the supply of oil to the further nebulizer does not features any fine adjustment system.

To complete the description of the diagram in FIG. 10, note that the supply line BA to the nebulizer 3 is exactly the same as that described earlier, with the sole further feature being a (possible) non-return valve 807, positioned on the supply of air to the medium/low pressure nebulizer 3.

The generator 1A in FIGS. 7-10 essentially operates as follows.

Preliminarily, a pre-set amount of oil is fed in, which settles on the bottom of the accumulation chamber 2.

The nebulizer 3 is then supplied with a line pressure (for example 6 bar) and the further nebulizer 3A with a higher pressure, for example 20 bar.

If air is not required by other user devices U1 or U2, the pressure inside the accumulation chamber 2 stabilizes at approximately 20 bar. The non-return valve 807 prevents the passage of air from the accumulation chamber 2 to the supply line BA to the nebulizer 3.

When air is required by the user devices, the pressure inside the accumulation chamber 2 lowers according to the air flow rate required.

For standard air flow rates (i.e., for example, when processing normal sized tools), the internal pressure of the tank lowers to the same level as the line pressure (i.e. approximately 5-6 bar).

In this case, both the nebulizer 3 and the further nebulizer 3A are working. Nevertheless the flow rate of the mist (and also the air) provided by the further nebulizer 3A is lower (or negligible) in comparison with the flow rate of the mist (and the air) provided by the nebulizer 3 which, in practice, works within their optimal range of pressure/flow rates and therefore with the maximum efficiency in terms of mist generation.

In practice, the further nebulizer 3A (which is optimised to work at much higher pressure levels and with low flow rates) works, in any case, at a line pressure (low), but the contribution thereof to the amount of mist is limited, and much less than that of the nebulizer 3, which is optimised to work at normal pressure levels too.

In the event that an additional air flow rate is required by the user devices, the pressure inside the chamber falls below a pre-set value. This is due to the fact that the air flow rate required exceeds the maximum air flow rate deliverable by the nebulizer 3 and by the further nebulizer 3A, and therefore there is a decrease in the pressure in the accumulation chamber 2.

In these conditions, the nebulizer 3 works at the maximum air flow rate thereof and the mist generated thereby is excessive with respect to that which would be needed for simply the air flow rate passing through via the nebulizers.

In these conditions, therefore the differential pressure regulator 12 (present also in this configuration) intervenes, clearing an additional passage for air to be fed directly into the accumulation chamber 2, thereby increasing the air flow rate with respect to the oil mist generated present in the chamber, and therefore optimizing the ratio of the oil/air fed out by the generator 1A; this prevents overly rich lubrication, exactly as mentioned earlier in relation to the generator 1.

In the event that the air flow rates required are, meanwhile, below standard, and this occurs, for example, when very small tools are used, the pressure in the accumulation chamber 2 rises above the optimal operating zone of the nebulizer 3, which gradually produces increasingly less mist. At the same time, as the pressure rises, the efficiency of the further nebulizer 3A increases, as the latter starts producing a gradually increasing flow of mist, entering the optimal operating range thereof.

When the pressure exceeds a certain threshold (for example 6.5), the non-return valve 807 (set, for example, to a pressure delta of 0.5 bar) intervenes, cutting off the nebulizer 3 completely. The non-return valve also prevents the air leaving the accumulation chamber 2 via the supply line to the nebulizer 3.

When the nebulizer 3 stops working, all the mist needed is generated by the further nebulizer 3A, which operates within the optimal operating range thereof, i.e. at rather high pressure levels and very low flow rates.

The progressive decrease in the flow rate of the nebulizer 3, and the increased efficiency of the further nebulizer 3A are an automatic consequence of the increase in the pressure in the accumulation chamber 2, due to the low air flow rate required.

The system illustrated, therefore, adapts automatically to the air flow rates required, maintaining an optimal amount of mist for lubrication at low flow rates too.

It should be noted that the increase in the lubrication pressure does not only aid the generation of a very fine mist, but also enables the more efficient cooling of small tools, which receive both more air and more oil, to the advantage of the said cutting process. A higher pressure of air also improves the removal of shavings produced by the said processing.

According to one variant of the generator 1A, a valve 805 may be featured (for example an automatic valve, set according to the pressure of the accumulation chamber 2, or operated by a solenoid) which can cut off the operation of the further nebulizer 3A, in particular operating conditions.

This can be useful since the high-pressure air supplied to the further nebulizer 3 is very costly to produce.

Therefore, for example, the valve 805 can be programmed to automatically open when the difference between the pressure inside the accumulation chamber 2 and the pressure of the supply to the nebulizer 3 (a line pressure of, for example, 6 bar) is near the minimum pressure needed to support a vortex in the nebulizer 3 (for example, 2 bar). This reduction in the pressure delta can, indeed, be a forewarning of either the need for very low lubrication flow rates (and therefore the intervention of the further nebulizer is necessary) or an interruption in the need for air lubrication (and in this case no high-pressure air is wasted, with the exception of that small amount needed to raise the pressure of the accumulation chamber 2 to the maximum supply pressure).

Obviously, in a simplified embodiment, valves can be simply be envisaged (manual or automatic, controlled by a control unit) which activate either the nebulizer 3, or the further nebulizer 3A or both, depending on the processing to carry out.

Various embodiments of the innovation are described herein, but others may also be conceived using the same innovative concept For example, the accumulation chamber 2 may have any conformation, and may also be embodied as a pressurised tank configured differently from that described above, with any cross-section.

Furthermore, a separate (and suitably pressurised) oil tank from the accumulation chamber 2, may be envisaged, for example, with a circulation system which carries the oil that accumulates in the accumulation chamber 2 into the main tank.

The configuration of the nozzle 7 is optimal in terms of the embodiment thereof since the channel or channels 8, 80 are formed between the nozzle 7 and the flat surface of the intermediate element 44. Nevertheless, the channel or channels inside the nozzle may also be produced by means of through-holes.

Furthermore, the nozzle 7 described herein is produced as a single part, which defines the chamber 9 equipped with a convergent section 70. Obviously, in variants of the embodiments, the nozzle 7 may be produce as multiple parts which are mutually assembled through gaskets.

The invention claimed is:

1. Air/oil mist generator, comprising an accumulation chamber inside which a mist of oil particles in air accumulates, the accumulation chamber being provided with:
   at least one first mist outlet, and
   at least one nebulizer leading into said accumulation chamber, the nebulizer comprising
      a first nozzle fed by pressurized air, the first nozzle including
         at least one first channel fed by the pressurized air, each first channel being provided with an outlet on a surface of the first nozzle,
         wherein the first nozzle at least partially defines a first one axially symmetrical chamber with respect to an axis,
         wherein each first channel is oriented so as to generate a rotation of the air introduced into the first chamber around said axis,
         wherein the surface of the first nozzle provides at least one section converging towards an outlet hole,
      a second nozzle fed by oil and having a delivery hole positioned into an upstream portion of said first chamber so that the oil is sucked through the second nozzle into the first chamber due to the flow of air flowing through the first chamber, wherein the delivery hole of the second nozzle is coaxial with said axis;
      wherein the outlet hole of the first nozzle opens into a divergent channel with a sidewall angled outward from the outlet hole; and
      wherein the divergent channel further includes a wall on a plane including an exit section of the outlet hole, said wall joining a perimeter of the outlet hole to the sidewall, and wherein the perimeter of the outlet hole is spaced from the sidewall a distance that is between 1.5 and 4.5 times a diameter of the outlet hole.

2. Generator according to claim 1, wherein the outlet hole faces a condenser provided inside the accumulation chamber.

3. Generator according to claim 1, wherein the delivery hole of the second nozzle faces the outlet of said channels at a half-way of the outlet.

4. Generator according to claim 1, wherein the second nozzle has a supply channel which sucks the oil present in liquid form inside the accumulation chamber, the supply channel comprising a flow regulator.

5. Generator according to claim 1, wherein the accumulation chamber is associated with a differential pressure regulator, which introduces compressed air into accumulation chamber, when the difference between the internal pressure of the accumulation chamber and the nebulizer supply pressure exceeds a predefined threshold value.

6. Generator according to claim 5, wherein the differential pressure regulator comprises a valve element loaded by a spring in the direction of an opening in communication with the supply of pressurized air, the spring and part of the valve element being in communication with the accumulation chamber so that, when the pressure in the accumulation chamber falls below a threshold value defined by the load of the spring on the valve element, the valve element frees the opening allowing a flow of air from the supply of pressurized air to the accumulation chamber and/or in which the output of the differential regulator inside the storage chamber includes a silencer.

7. Generator according to claim 5, wherein the nebulizer is fed by a first line of compressed air at a first pressure, and an additional nebulizer is present, which also leads to the accumulation chamber, the further nebulizer being fed by a second line of compressed air at said second pressure higher than the first pressure, the first line being optionally associated with a non-return valve which prevents a counter-flow from the accumulation chamber.

8. Generator according to claim 7, wherein the additional nebulizer is geometrically similar to the nebulizer, and/or is configured to work with an airflow that is lower of the airflow of the nebulizer.

9. Lubrication system, comprising a generator according to claim 8.

10. The generator according to claim 1, wherein each first channel defines a path along a vector with both a circumferential and a radial direction with respect to the axially symmetrical chamber.

11. The generator according to claim 1, wherein the at least one first channel comprises a plurality of first channels.

12. The generator according to claim 1, wherein the delivery hole of the second nozzle defines a plane that intersects the at least one first channel.

* * * * *